Nov. 29, 1932.  E. B. ILYUS  1,889,663
ELECTRICAL WEIGHING AND MEASURING DEVICE
Filed Aug. 29, 1930  4 Sheets-Sheet 1
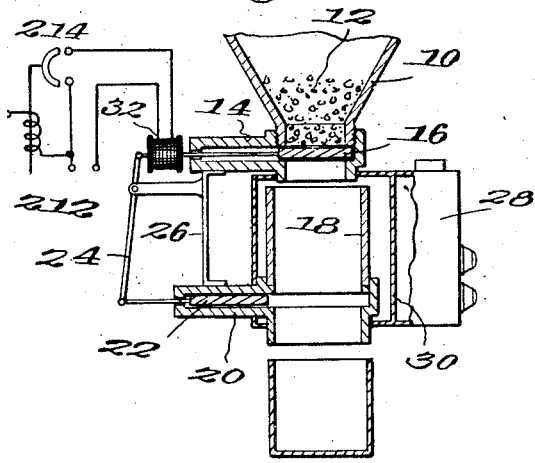
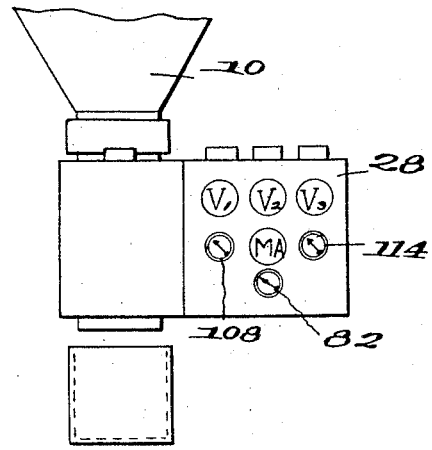
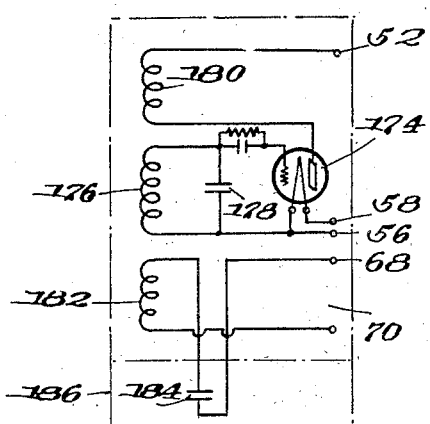
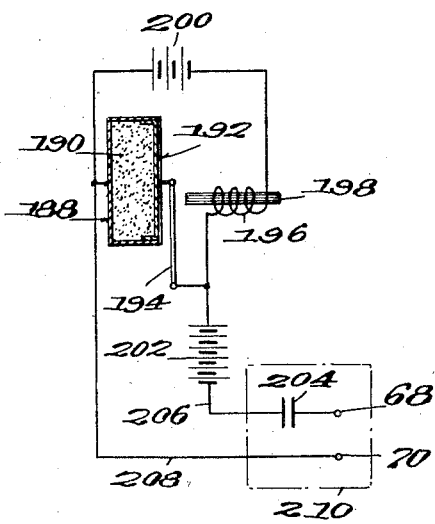
Inventor
E. BURWELL ILYUS
By
Attorney Inventor
E. BURWELL ILYUS
By
Attorney

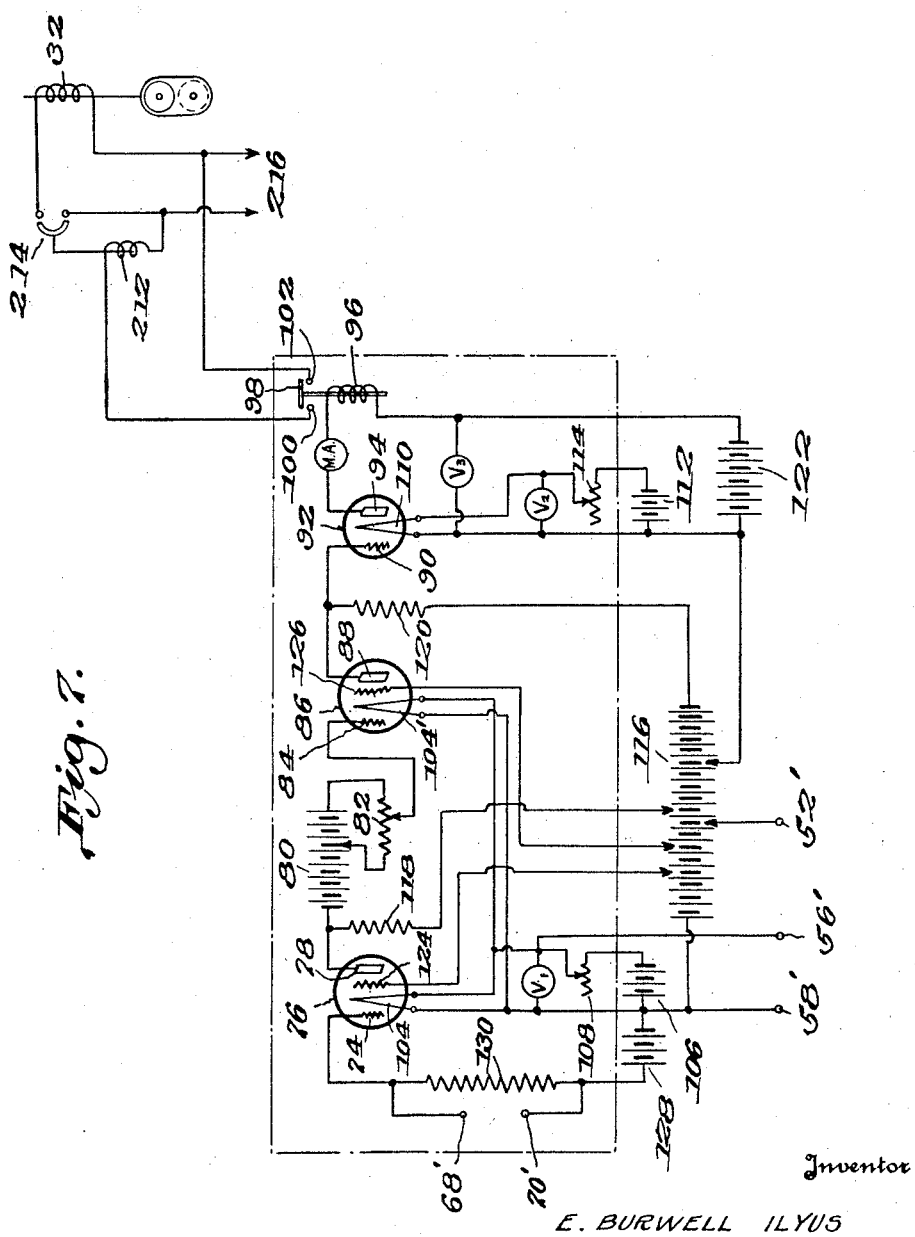

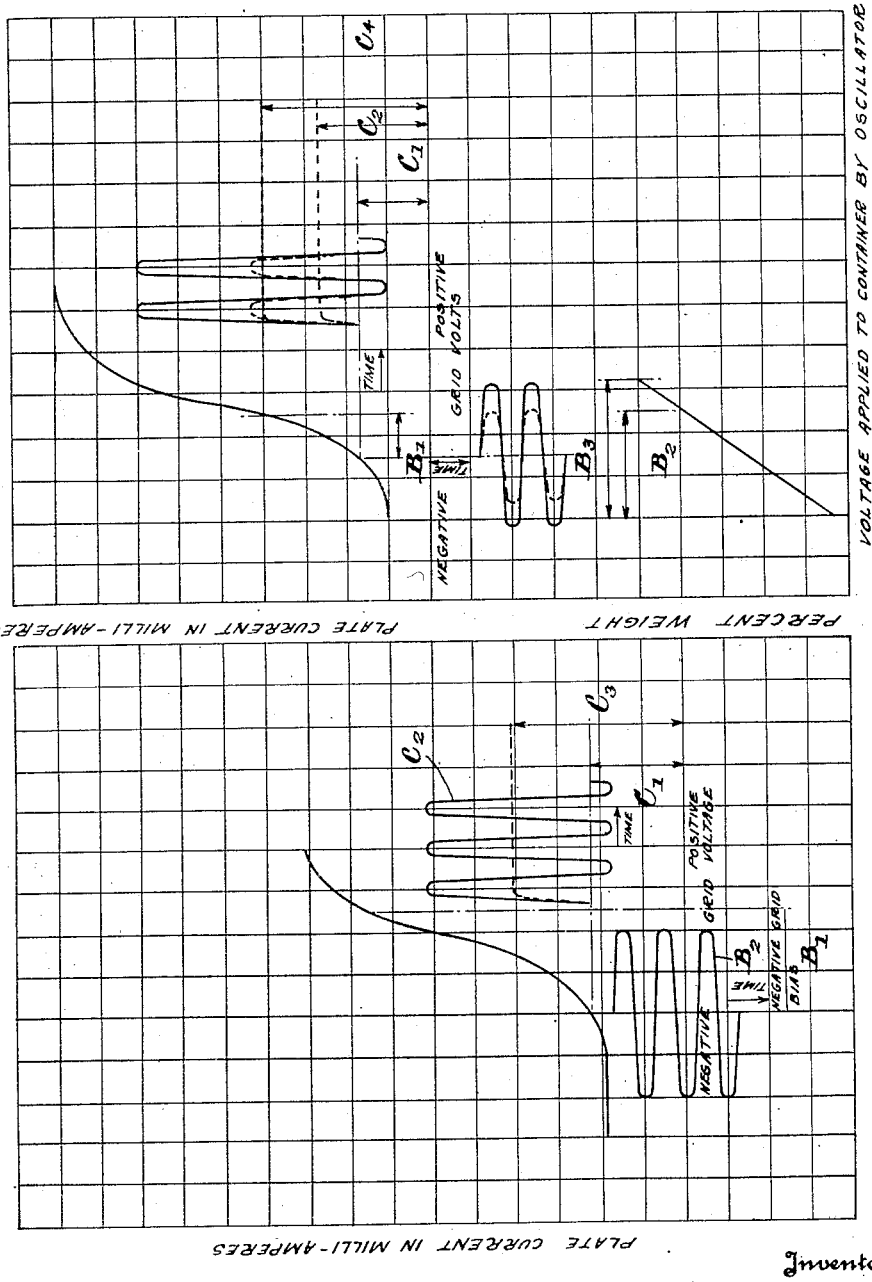

Patented Nov. 29, 1932

1,889,663

UNITED STATES PATENT OFFICE

EDMUND BURWELL ILYUS, OF NEWARK, NEW JERSEY, ASSIGNOR TO ARENCO MACHINE COMPANY, INC., OF NEW YORK, N. Y., A CORPORATION OF NEW YORK

ELECTRICAL WEIGHING AND MEASURING DEVICE

Application filed August 29, 1930. Serial No. 478,771.

This invention relates to the measuring and weighing of substances and more particularly it relates to a method of and means for measuring and weighing substances by matching quantities of the substances by dielectric constant. The invention is herein shown as embodied in a device for automatically dispensing various kinds of material from a bin or chute into cartons or containers, but the invention in its many features is not limited to devices even of this general type.

The method involved utilizes the well known principle that all solids, liquids and gases have what is called a dielectric constant as compared with free air space. That is, if air is assumed to have a dielectric constant of unity, then certain materials, such as rubber, bakelite, etc., will have a constant greater than unity.

In the present invention this principle is effectively utilized in my method and means for accurately measuring and rapidly dispensing predetermined quantities or weights of materials, such as food, chemical and other products into cartons or other containers.

In carrying out the invention, a condenser is coupled in an electric circuit. The frequency of this condenser is adapted to be tuned to the predetermined frequency of a second circuit by placing an increasing amount of the substance to be measured between the plates of the condenser to vary the capacity thereof.

As herein described the principle above mentioned is utilized to control the automatic dispensing equipment. The proper amount of the material or substance to be measured is segregated from the main supply, is guided to a measuring container, and is then allowed to pass to an empty carton positioned beneath the measuring container. Only one form of the automatic mechanism has been described and illustrated. It is obvious that the invention may be utilized with equal effectiveness with many different dispensing devices, and I do not wish to be limited to the form disclosed herein.

Referring to the drawings accompanying this specification, Fig. 1 is a side elevation of an embodiment of the invention and showing a part of the dispensing and measuring apparatus in section;

Fig. 2 is a front elevation of the embodiment shown in Fig. 1;

Fig. 5 is a wiring diagram of a further modification of the oscillator and transfer circuits;

Fig. 6 is another modification of the circuits;

Fig. 7 is a wiring diagram of the multiple stage amplifier, detector and relay circuits in the electrical control system;

Fig. 9 is a plat of the characteristic curve of a detector tube showing action of the voltage applied to the grid with high negative bias; and Fig. 10 is a plat of the characteristic curve of the detector tube in the electrical control system of Fig. 7 and showing the theory of operation of the measuring circuit.

Figure 3:
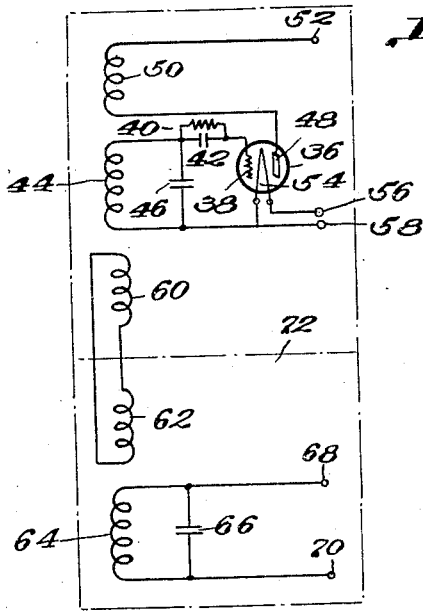
Fig. 3 is a wiring diagram of the radio frequency oscillator and transfer circuits in the electrical control system.

Referring to Fig. 1, the dispensing apparatus comprises in its preferred form, a chute 10 containing the material 12 to be dispensed, a cut-off valve housing 14 in the bottom of the chute having a slide valve 16, a metallic measuring container 18 open at both ends and having certain electrical characteristics to be described later, a cut-off valve housing 20 below the measuring container having a slide valve 22 adapted to close the bottom of the container, a link 24 pivoted at its ends to an extension of each slide valve and at an intermediate point to a rigid support 26 secured to the valve housings, an electrical alternating current generating and amplifying apparatus 28 mounted on the front of the dispensing apparatus, to be described later, and a metallic shield member 30 enclosing the measuring container except at its ends and spaced therefrom.

The valve housings and slide valves are constructed of a suitable insulating material such as hard rubber or bakelite, and the container 18 and the shield member 30 are mounted between them as shown. Two metallic sides of the container 18 are preferably of brass or aluminum, and form the plates of an electrical condenser having a fixed capacity and a dielectric constant of 1 by virtue of the air space enclosed by the plates. The shield member 30 acts both as an electro-static shield to insulate the measuring device from outside electro-static influence, and also as a container to exclude foreign substances.

The fixed condenser, so formed, is connected in an electrical system 28 and controls the operation of slide valves through a solenoid 32. A carton is shown in position to receive the measured quantity of dispensed material.

As shown in Fig. 1, the cut-off valves 16 and 22 are so mechanically interlocked by the link 24 that the upper valve is fully closed under the chute exit when the lower valve is fully open or retracted from the open bottom of the measuring container 18, and vice versa. After operation of the valves by the solenoid 32, the valves are returned to their opposite position by any well known means, for example, by a spring (not shown). Common means for returning the valves to their original position of this nature are shown in the patent to Howard No. 1,204,274 and in the patent to Turner No. 1,198,169 (see Fig. 22 of that patent).

Figure 8:
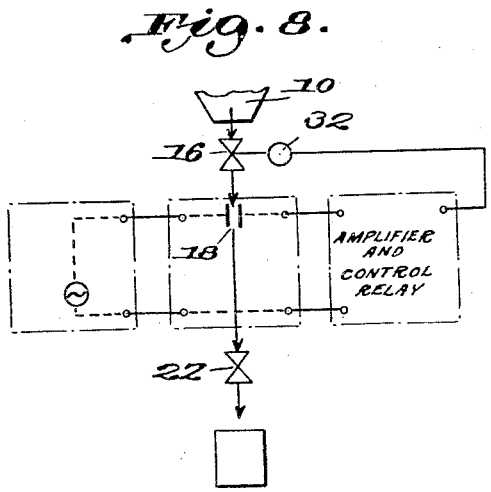
Fig. 8 is a schematic diagram of the complete dispensing, measuring and electrical control apparatus comprising the invention.

The electrical apparatus 28 and its cooperation with the above described dispensing and measuring apparatus is schematically illustrated in Fig. 8 wherein the vertical arrows indicate the path of the material in its passage from the chute 10 through the cut-off valve 16 in the chute, thence into the measuring container 18, through the lower cut-off valve 22 operated by movement of the other valve, and finally its discharge into the carton. The capacity of the measuring container 18 is designated conventionally by the two parallel lines as a fixed condenser which is included in series circuit between an alternating current generator of high constant frequency and voltage and an amplifier and detector in the output circuit of the generator. There is also shown the control relay connected to the valve operating solenoid.

The high frequency alternating current generator and transfer circuit are shown diagrammatically in Fig. 3. The generator comprises a three electrode vacuum tube 36 having its grid 38 connected through a grid leak 40 and condenser 42 to an inductance 44 shunted by a fixed capacity (condenser) 46. The plate 48 is connected to an inductance 50 and the terminal 52, and filament 54 is connected to the terminals 56 and 58 and the grid return. With the inductances coupled as shown and the terminals 52, 56 and 58 connected, respectively, to the terminals 52', 56' and 58' from the plate and filament batteries shown in Fig. 7, the system just described will generate high frequency oscillation of constant voltage and at the resonant frequency determined by the resonant period of the tuned circuit 44, 46. The transfer circuit includes the inductance 60 coupled to inductance 44 and the inductance 62 coupled to the inductance 64 and connected in series as shown, the inductance 64 and a capacity (condenser) 66 being connected in parallel to the terminals 68, 70. A metal shield 72 is arranged to enclose the generator and its coupling inductance 60 in one compartment and the tuned circuit 64 and 66 and coupling inductance 62 in another compartment so as to confine the transfer of energy through the link circuit 60 and 62 from the generator to the terminals 68, 70.

The tuned circuits 44, 46 and 64, 66 have identical electrical characteristics and are resonant to the fixed frequency of the oscillator under certain operating conditions now to be explained.

In the description of Fig. 1, it was stated that the plates of the container 18 were arranged to form a capacity of fixed value when the container 18 is empty. However, when the container is being filled with the material 12 from the chute 10 the dielectric within the condenser plates, represented by the metallic walls of the container, is altered and in conformance with well known electrical principles the capacity of this condenser is varied proportionately with the volume or weight of material within the container. From the above explanation it will be clear that the measuring container 18 will have a predetermined fixed electrical capacity when empty and a different predetermined fixed capacity when filled and that the latter capacity will vary with the dielectric constant of the particular material being measured. In Fig. 3 this capacity is represented by the condenser 66.

It is well known in the electrical art that the maximum high frequency energy is transferred to, or the greatest potential difference is established between, terminals 68, 70 only when the circuits 44, 46 and 64, 66 are sharply tuned to the constant frequency of the generator 36. A variation in the capacity changes the resonant period of the circuit and this change may be effected by varying the dielectric between condenser plates of fixed dimensions and spacing.

Briefly, then, the condenser 46 is made an exact duplicate, or its equivalent, of the condenser 66 comprising plates of the container 18 when filled with the exact quantity or weight of the material to be supplied to each carton. In other words, the container, opposite walls of which form plates of a condenser, is filled with the exact amount of the material to be dispensed and is designed to cause the generator to transfer energy to circuit 64, 66 at a constant frequency and potential. When the container 18 is filled with exactly the same amount of the same material or one having the same dielectric constant, the capacity 66 tunes its circuit to the same frequency and thus establishes the maximum potential across terminals 68, 70.

However, when the container 18 is empty or only partially filled, this circuit offers a substantially high impedance to the transfer of the electrical energy and the potential difference at terminals 68, 70 is proportionately less.

In electrical terms, the maximum potential difference across 68, 70 exists only when the two containers forming the condensers 46 and 66 contain the same amounts of the same material or their dielectric equivalents. Since the available energy at terminals 68, 70 is inadequate to control the cut-off valves in the dispensing apparatus, it must be amplified by a high frequency amplifying system now to be described.

In this amplifying system, diagrammatically shown in Fig. 7, the input terminals 68', 70' connect to 68, 70 of the measuring circuit 64, 66. The amplifier consists of a plurality of direct coupled high frequency amplifier stages utilizing the screen grid type of vacuum tube and a detector stage utilizing a three electrode tube.

The input of the first stage is connected to the control electrode or grid 74 of screen grid tube 76 and the anode or plate 78 of this tube is connected through a biasing battery 80 and rheostat 82 to the control grid 84 of the second screen grid tube 86. The plate 88 of this tube is connected directly to the grid 90 of the detector tube 92 and the plate 94 of the detector tube is connected in series with the milliammeter MA and the relay 96 having contactor 98 and contacts 100, 102. The filaments 104 and 104' of tubes 76 and 86 are energized by the direct current source 106 through rheostat 108. The filament 110 of tube 92 is connected across the direct current source 112 through the rheostat 114. The plate source of direct current 116 is tapped off at suitable potentials as shown and connected to the plates of tubes 76 and 86 through fixed resistances 118 and 120 of high value. The plate circuit of detector 92 is supplied by the direct current source 122 and the screen grids 124 and 126 of tubes 76 and 86 are connected by suitable voltage taps to the plate battery 116, as shown.

The negative biasing battery 128 is connected to grid 74 through inductance 64 (Fig. 3) or through fixed resistance 130 which is only connected in circuit when the modifications shown in Figs. 5 and 6 are connected to the terminals 68', 70' of the amplifier.

Figure 4:
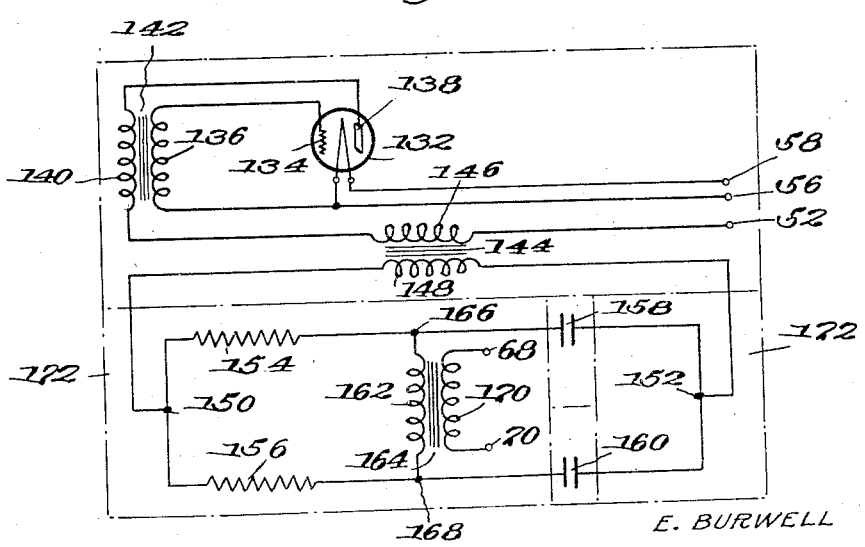
Fig. 4 is a wiring diagram of a modification of the oscillator and transfer circuits.

In the modifications shown in Fig. 4, the oscillation generating circuit comprises the three electrode vacuum tube 132 whose grid 134 is connected to the inductance 136 and whose plate 138 is connected to the inductance 140 coupled to inductance 136 forming an iron core transformer 142. A second iron core transformer 144 has its winding 146 connected in series with winding 140 and terminal 52. The other winding 148 is connected across conjugate points 150 and 152 of a Wheatstone bridge having resistances 154 and 156 in one pair of arms and the capacities (condensers) 158 and 160 in the other pair of arms. The winding 162 of transformer 164 is connected across the other conjugate points 166 and 168 and is coupled to the winding 170 which in turn is connected to the terminals 68, 70 which connect with the amplifier input terminals 68', 70'. The above circuits are properly shielded by the metallic shield 172, as shown.

It is important to note that the capacities (condensers) 158 and 160 represent the electrical capacity of two identical containers 18 in Fig. 1. The operation of the electrical circuit just described is as follows. When the containers both contain the same amount of material, the capacities 158 and 160 are equal and balance the potentials in the arms of the Wheatstone bridge so that a zero potential is established across the terminals 68, 70. In using this system with the control system shown in Fig. 7 the relay 96 is arranged to close the circuit across the contacts 100, 102 on minimum current flow in the output of tube 92 instead of maximum current flow when the system shown in Fig. 3 is used.

The electrical system shown in Fig. 5 comprises a three electrode oscillator tube 174 having a grid circuit including the inductance 176 tuned to the generated frequency by a commercial fixed condenser 178 coupled to the inductance 180 in the plate circuit and to the inductance 182 in the tuned measuring circuit. The latter circuit includes the condenser 184, representing the electrical capacity of the measuring container 18, in series with the output terminals 68, 70. The plate and filament direct current potentials are supplied through terminals 52, 56, 58 and the shield 186 is arranged to isolate the capacity (condenser) 184.

Fig. 6 is a diagrammatic view of a low frequency oscillator which may be used with the electrical amplifying and control system of Fig. 7 and consists of a so-called "microphone" oscillator comprising a cup 188 filled with carbon granules 190 and held in place by a diaphragm 192. In contact with this diaphragm is a bar of spring steel 194 having a natural period of vibration of the predetermined frequency the oscillator is to generate. In magnetic relation to this bar is an electromagnet consisting of a winding 196 on an iron core 198 and energized by a battery 200. The vibrations of the spring bar 194 cause the diaphragm to vary the pressure on the carbon granules and hence the resistance thereof. The current through the circuit including battery 200, microphone 188, 190, 192, bar 194 and magnet 196 pulsates at a frequency determined by the natural period of the bar 194, or a low frequency. A second battery or other direct current source 202 is connected at the point shown in the oscillating circuit in series with the (container) capacity 204 and terminal 68 through wire 206. The other wire 208 connecting terminal 70 to the cup 188. Thus the low frequency pulsating direct current potentials at terminals 68, 70 may be impressed upon the amplifier and control system shown in Fig. 7. The (container) capacity 204 is protected by a shield 210.

The systems shown in Figs. 3 and 5 are preferably arranged to oscillate at a high or intermediate radio frequency whereas the system shown in Figs. 4 and 6 are designed for low or audible frequencies. The amplifier and detector system shown in Fig. 7 is adapted for efficient operation with any one of the oscillators by virtue of the direct coupling between stages.

The operation of the electrical system in controlling the dispensing of material by volume or weight within predetermined limits will be better understood by an explanation of the theory of operation of the detector tube 92 in the amplifying system shown in Fig. 7.

Referring to Fig. 9 which is a plat of the plate current-grid voltage characteristic curve of a detector tube, $B_1$ represents the direct current negative grid bias impressed on the grid of the tube and $C_1$ represents the resulting direct current plate current in the output. When a high frequency alternating current voltage $B_2$ is impressed on the grid, a corresponding pulsating current $C_2$ is set up in the plate circuit having an effective steady direct current $C_3$.

In this manner the high frequency oscillations on the grid of the detector tube are amplified and cause an effective increase in the plate current by an amount represented by the difference $C_3$—$C_1$.

Referring now to Fig. 10, which is a plat of the plate current-grid voltage characteristic curve of the detector tube 92 in the amplifying system used in the present invention, $B_1$ represents the direct current grid bias voltage and $C_1$ indicates the normal plate current in the output of the tube. If the measuring container 18 is approximately 99.5% filled its electrical capacity is insufficient to cause a condition of exact resonance in the transfer circuit coupled between the oscillator and the amplifier-detector circuit and thus the alternating potential impressed upon the latter circuit will not be as high as when the container is 100% filled. This potential, of course, is greatly amplified by the radio frequency amplifier stages 76 and 86 and impressed upon the grid of the detector tube 92. In the characteristic curve shown in Fig. 10, $B_2$ represents the alternating current potential applied to the grid when the container is 99.5% filled and $C_2$ is the value of the plate current in the output circuit of the tube representing an effective increase of $C_2$—$C_1$. $B_3$ represents the alternating potential applied to the grid when the container is 100% filled and $C_4$ is the resulting effective value of the plate current. Thus it will be seen that a relatively small change in grid potential due to a small addition to the contents of container 18 causes a relatively greater increase in plate current in the detector output and this characteristic is utilized by the relay circuit in controlling the operation of the cut-off valves of the dispensing apparatus so that the quantity of material delivered to each carton may be uniformly the same.

Referring again to Fig. 7, the relay in the plate circuit of detector tube 92 comprises the solenoid 96 in series with the plate 94, battery 122 and filament 110 and a contactor 98 so spring biased as to close the circuit across contacts 100 and 102 when maximum current flows in the said circuit. That is, when container 18 is 100% filled and the transfer circuit such as 64, 66 is in resonance with the oscillator frequency. The tripping of this relay connects the solenoid 212 of the power relay 214 across the power mains 216 which in turn connects the valve operating solenoid 32 (see Fig. 1) across the power mains. The energizing of this solenoid operates the cut-off valves 16 and 22 to cut off the flow of material into the container 18 from the chute 10 and allows the measured quantity to flow into the carton below. The two valves are returned to their initial positions by suitable mechanism (not shown) cooperating with a conveyor carrying empty receptacles to be filled or other mechanism for placing cartons beneath the container 18. The voltmeters $V_1$, $V_2$ and $V_3$ may be connected in circuit to measure the filament and plate potentials at the points shown and the milliammeter MA is connected in the plate circuit of detector 92 to indicate by its maximum reading when the measuring container is 100% filled.

Having now described my invention, what I claim and desire to secure by Letters Patent of the United States is:

1. The method of dispensing material, which consists in mechanically and completely segregating the material in unit quantities and controlling the segregation electrically by the dielectric characteristic of the material.

2. The method of controlling the dispensing of material in units by weight which consists in establishing a standard unit for comparison, mechanically and completely separating a unit of said material corresponding to the standard, and electrically balancing the dielectric characteristics of both said units in a circuit for controlling the mechanical separation.

3. In a weighing apparatus having a measuring container two walls of which form the plates of a condenser, an oscillating electric circuit of fixed voltage and frequency, a tunable circuit including said container, and means for depositing the material to be weighed in said container, said means operating to completely cut off the supply to said container when such an amount of the material is placed in said container as to vary the capacity of the condenser and tune said tunable circuit in resonance with said first named circuit, said means also operating to discharge the material segregated in the container from the container.

4. A weighing apparatus comprising a measuring container, means for controlling the passage of material into said container, an electrical system comprising a tunable circuit having a peaked resonance characteristic and including an element variable proportionately with the amount of material in the container, a control circuit coupled to said tunable circuit and cooperating with said control means to segregate a predetermined quantity or weight of material in said container to cut off the supply to said container and to simultaneously discharge said predetermined quantity of material from said container.

5. An automatic dispensing apparatus including material storage means, a measuring container, cooperating valve means for alternately filling and emptying said container, an electrical system including an oscillation generator of fixed voltage and frequency, a tunable transfer circuit, an amplifier circuit and relay control means, a variable reactance including said measuring container and deposited material forming the tunable element in said transfer circuit, and means connecting said relay control means to said valve means to operate said valve means when said tunable circuit is in resonance with the fixed voltage and frequency of said oscillation generator to segregate a predetermined amount of material in said container and simultaneously cut off the supply to said container and discharge the segregated material from said container.

6. The method of controlling the dispensing of material in units which consists in causing the material to move into a space, constantly measuring the dielectric capacity of the material within the space, automatically stopping travel of the material and segregating that portion of the material which is within the space when the dielectric capacity of the material within the space reaches a predetermined value, and discharging the material segregated within the space from the space.

7. The method of controlling the dispensing of material in units which consists in intermittently and mechanically segregating units of said material, each unit corresponding to a predetermined standard, and controlling the intermittent segregations electrically by the dielectric characteristics of the material.

8. A dispensing apparatus comprising a chamber, means for feeding material to the chamber, means for constantly measuring the dielectric capacity of the material within the chamber, means for rendering said feeding means inoperative and segregating the material within the chamber from the material within the feeding means when the dielectric capacity of the material within the chamber reaches a predetermined value, and means for discharging the segregated material from the chamber.

9. A dispensing apparatus comprising a chamber, means for feeding material to the chamber, means for constantly measuring the dielectric capacity of the material within the chamber, means for simultaneously rendering said feeding means inoperative, segregating the material within the chamber from the material within the feeding means and discharging the segregated material from the chamber when the dielectric capacity of the material within the chamber reaches a predetermined value.

10. In a dispensing device, a container two walls of which comprise the plates of the condenser, means for supplying material to the container, and means for simultaneously rendering said first means inoperative to segregate a predetermined amount of material within the container and to discharge said segregated material from said container, said last named means being controlled by the dielectric characteristics of the material between the condenser plates.

11. An automatic dispensing apparatus comprising a container, two walls of which form the plates of a condenser, means for feeding material to the container, means for simultaneously opening one end of the container and closing the other for controlling the passage of material into and out of said container, and an electrical system including means controlled by the dielectric characteristics of said material for automatically controlling said first named means for segregating predetermined amounts of the material in the container from the material in the feeding means, said means operating when the dielectric capacity of the material within said container reaches a predetermined value.

In testimony whereof I have hereunto set my signature.

E. BURWELL ILYUS.